(12) United States Patent
Sevagen et al.

(10) Patent No.: US 10,760,678 B2
(45) Date of Patent: Sep. 1, 2020

(54) MECHANICAL TRANSMISSION DEVICE

(71) Applicant: SAFRAN ELECTRONICS & DEFENSE, Boulogne Billancourt (FR)

(72) Inventors: Bertrand Sevagen, Boulogne Billancourt (FR); Nicolas Ravoux, Boulogne Billancourt (FR); Etienne Merlet, Boulogne Billancourt (FR); Zakaraya Imounssi, Boulogne Billancourt (FR)

(73) Assignee: SAFRAN ELECTRONICS & DEFENSE, Boulogne Billancourt (FR)

( * ) Notice: Subject to any disclaimer, the term of this patent is extended or adjusted under 35 U.S.C. 154(b) by 0 days.

(21) Appl. No.: 16/349,541

(22) PCT Filed: Oct. 27, 2017

(86) PCT No.: PCT/EP2017/077684
§ 371 (c)(1),
(2) Date: May 13, 2019

(87) PCT Pub. No.: WO2018/086918
PCT Pub. Date: May 17, 2018

(65) Prior Publication Data
US 2019/0277396 A1 Sep. 12, 2019

(30) Foreign Application Priority Data
Nov. 14, 2016 (FR) ...................... 16 61013

(51) Int. Cl.
*F16H 57/08* (2006.01)
*F16H 1/28* (2006.01)

(52) U.S. Cl.
CPC ............ *F16H 57/082* (2013.01); *F16H 1/28* (2013.01)

(58) Field of Classification Search
None
See application file for complete search history.

(56) References Cited

U.S. PATENT DOCUMENTS

| 2,496,928 | A | 2/1950 | Bing et al. | |
|---|---|---|---|---|
| 2006/0154778 | A1 | 7/2006 | Sowul et al. | |
| 2010/0151986 | A1* | 6/2010 | Burgman | F16H 57/0479 475/348 |
| 2012/0003096 | A1* | 1/2012 | Nakashima | F16H 57/082 416/170 R |
| 2012/0208669 | A1* | 8/2012 | Nakashima | F03D 15/10 475/348 |
| 2017/0082175 | A1* | 3/2017 | Chung | F16H 37/065 |

FOREIGN PATENT DOCUMENTS

| DE | 10 2009 028517 A1 | 2/2011 |
|---|---|---|
| EP | 0 369 597 A2 | 5/1990 |
| EP | 2 617 882 A1 | 7/2013 |
| EP | 2 784 192 A1 | 10/2014 |

* cited by examiner

*Primary Examiner* — Colby M Hansen
(74) *Attorney, Agent, or Firm* — Muncy, Geissler, Olds & Lowe, P.C.

(57) ABSTRACT

A mechanical transmission device having a planet carrier and at least two planets mounted on the planet carrier by means of respective rotation shafts. The device includes a stop for stopping movement of the various rotation shafts in axial translation.

8 Claims, 7 Drawing Sheets

MECHANICAL TRANSMISSION DEVICE

The invention relates to a mechanical transmission device.

TECHNOLOGICAL BACKGROUND OF THE INVENTION

In mechanical transmission devices of the epicyclic gear train type, the planet carrier carries a plurality of planets that are mounted on the planet carrier via respective rotation shafts.

In order to avoid said rotation shafts performing interfering movements relative to the planet carrier, a stop ring is generally associated with each rotation shaft to prevent the corresponding rotation shaft moving axially.

Unfortunately, it can happen during assembly of the epicyclic gear train that the operator forgets to put one or more stop rings into place or does not do so properly. Because of the small size of the stop rings, one or more forgotten or wrongly placed stop rings are not always detected.

This can lead to a degraded epicyclic gear train being put into operation.

OBJECT OF THE INVENTION

An object of the invention is to propose a mechanical transmission device that obviates the above-mentioned drawbacks, at least in part.

BRIEF DESCRIPTION OF THE INVENTION

In order to achieve this object, there is provided a mechanical transmission device comprising a planet carrier and at least two planets mounted on the planet carrier by means of respective rotation shafts.

According to the invention, the device includes a stop for stopping movement of the various rotation shafts in axial translation.

As a result, a single part serves to stop all of the rotation shafts from moving in axial translation relative to the planet carrier, thereby simplifying assembly of the mechanical transmission device. In addition, any risk of forgetting to install the stop is very low given its size (e.g. compared with a stop ring): if it is absent, that is easily detected.

In particular manner, the planet carrier extends about a main axis and the stop is shaped to be coaxial with said main axis.

By way of example, this enables a local cutout to be made in the stop in order to receive a sensor or any other element that is not tied to one of the rotation shafts.

In particular manner, the stop is shaped to be arranged at the center of the planet carrier.

In particular manner, the stop is shaped to be arranged at the periphery of the planet carrier.

In particular manner, the device includes at least one plate having a base and a central shaft extending said base, the stop being carried by said base.

In particular manner, the stop includes portions inserted in grooves formed in each of the rotation shafts, each of said grooves being arranged respectively over a fraction only of the circumference of the associated rotation shaft.

As a result, the rotation shafts are prevented from turning about the respective axes.

Thus, a single stop serves to stop all of the rotation shafts from moving axially in translation relative to the planet carrier, while also preventing said rotation shafts from rotating about their own axes.

Furthermore, the stop is also equally well applicable to rotation shafts that are solid and to rotation shafts that are hollow tubes, which is not possible with a conventional stop ring of the prior art.

The stop includes portions inserted in grooves formed in each of the rotation shafts and in corresponding slots in at least one plate of the planet carrier carrying the rotation shafts of the planet carrier, which slots give access to said grooves, the stop thus being carried by said plate by co-operation with said slots.

The stop is shaped to be secured to the planet carrier by snap-fastening to said planet carrier.

This serves in particular to prevent the stop turning relative to the plates of the planet carrier.

The stop including portions inserted in grooves formed in each of the rotation shafts, each of said portions including an abutment and a snap-fastener tab for snap-fastening the stop to the planet carrier at each of said rotation shafts.

This serves to secure the stop better to the planet carrier by means of the various snap-fastener zones.

In particular manner, the stop includes rounded fillets between its various portions.

In particular manner, the snap-fastener tabs are shaped to provide overcenter locking with the planet carrier when the stop is secured to the planet carrier.

The stop is plane.

The various elements of the stop are thus arranged in the same plane. In particular, if the stop has abutments and snap-fastener tabs, they all extend in the same plane as the remainder of the stop.

This thus procures a stop that is relatively simple and thus more accurate. The stop is also more robust, less expensive, and less heavy.

Other characteristics and advantages of the invention appear on reading the following description of a particular, non-limiting embodiment of the invention.

BRIEF DESCRIPTION OF THE DRAWINGS

The invention can be better understood in the light of the following description of particular, non-limiting embodiments of the invention. Reference is made to the accompanying figures, in which.

DETAILED DESCRIPTION OF THE INVENTION

Figure 1:
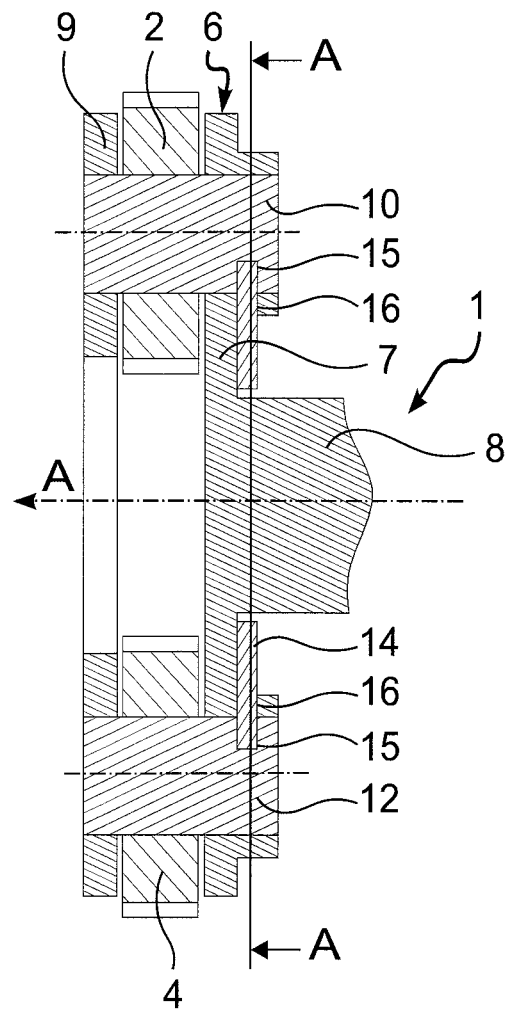
FIG. 1 is a side view showing a portion of a transmission device in a first embodiment of the invention.
Figure 2:
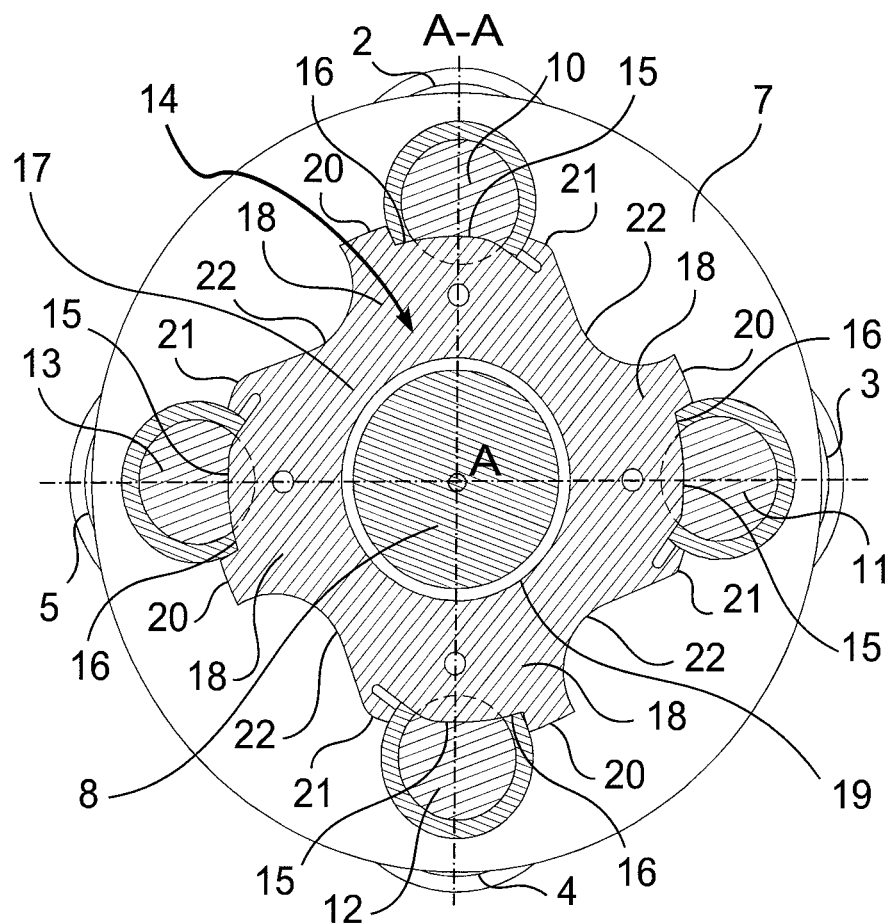
FIG. 2 is a section view of the portion of the device shown in FIG. 1.

With reference to FIGS. 1 to 2, a first embodiment is described below.

The mechanical transmission device, such as an epicyclic gear train, comprises a planet carrier 1 and four planets 2, 3, 4, and 5. The planet carrier 1 typically comprises an inner plate 6 having a base 7 extended by a central shaft 8 extending along an axis A, and an outer plate 9, the planets 2, 3, 4, and 5 being arranged between the two plates 6 and 9. The outer plate 9 and the base 7 of the inner plate 6 in this example are generally circular in section (in a section plane normal to the axis A) and coaxial with the axis A.

The first planet 2 is rotatably mounted on the planet carrier 1 between the two plates 6 and 9 by means of a first rotation shaft 10, the second planet 3 is rotatably mounted on the planet carrier 1 between the two plates 6 and 9 by means of a second rotation shaft 11, the third planet 4 is rotatably mounted on the planet carrier 1 between the two plates 6 and 9 by means of a third rotation shaft 12, and the fourth planet 5 is rotatably mounted on the planet carrier 1 between the two plates 6 and 9 by means of a fourth rotation shaft 13. Naturally, the rotation shafts 10, 11, 12, and 13 are parallel with one another and with the axis A.

In this example, the rotation shafts 10, 11, 12, and 13 are cylindrically shaped and without any shoulders at their ends.

This enables the axial volume of the device to be limited and makes the device easier to machine.

The device also has a stop 14 for axially stopping the various rotation shafts 10, 11, 12, and 13, as carried by the planet carrier 1.

Each of the rotation shafts 10, 11, 12, and 13 has a groove 15 for receiving said stop 14. By way of example, said grooves 15 may be provided in the ends of the rotation shafts 10, 11, 12, and 13 situated beside the inner plate 6. The base 7 of the inner plate 6 includes corresponding slots 16 for giving access to said grooves 15. By way of example, the grooves 15 are smooth.

In particular, each of said grooves 15 is formed in a fraction only of the circumference of the associated rotation shafts 10, 11, 12, or 13.

The grooves 15 are thus shaped so as to be complementary in shape to the portion of the stop 14 that is inserted in said groove.

In the present example, the rotation shafts 10, 11, 12, and 13 are solid (but they could equally well be hollow).

In this example, the stop 14 is plane. The stop 14 is arranged so that a normal to said plane extends substantially parallel to the axis A and thus to the axes of the various rotation shafts.

The stop 14 has a substantially circular main portion 17 from which four mutually identical radial extensions 18 extend symmetrically, there being one radial extension 18 for each planet. The stop 14 is thus generally in the shape of a plane cross.

At the center of the main portion 17 there is provided an orifice 19 to enable the stop 14 to be arranged around the central shaft 8 of the inner plate 6. As a result, the stop 14 is arranged against the inner plate 6 and at the center of the planet carrier 1.

As a result, it should also be observed that the stop 14 is centered on the axis A of the planet carrier. The stop 14 is thus about said axis A.

Nevertheless, the stop 14 is not fastened to the central shaft 8. In this example, clearance thus exists between the orifice 19 in the stop and the central shaft 8. In contrast, the stop 14 is carried by the base 7 of the inner plate 6 by being held axially in the slots 16.

In this example, the stop 14 is also shaped so as to be capable of being snap-fastened to said base 7 in order to reinforce the fastening of the stop 14 to the planet carrier 1. This also serves to prevent the stop 14 from turning about the axis A and thus the base 7.

For this purpose, each lateral extension 18 in this example has a free end shaped to be inserted in the slot 16 and in the groove 15 of the corresponding rotation shaft. In this example, each lateral extension 18 is substantially in the shape of a circular arc. Thus, in corresponding manner, the various grooves 15 likewise present a complementary shape as a portion of a disk having the same external curvature, as mentioned above.

Each lateral extension 18 is also provided with an abutment 20 that comes to bear at one end of the slot 16 against the base 7 of the inner plate 6 in the vicinity of the associated rotation shaft when the stop 14 is in place in the planet carrier 1.

Furthermore, a snap-fastener tab 21 is associated with each free end and arranged substantially opposite the abutment 20 associated with said free end.

It should be observed that because the stop 14 is plane, the main portion 17, the radial extensions 18, the snap-fastener tabs 21, and the abutments 20 thus all lie in the same plane.

In particular manner, at least the snap-fastener tabs 21, and preferably the entire stop 14, is/are made of a material that is elastically deformable. The stop 14 is typically made of a spring material, such as for example a steel, a copper alloy, or a spring polymer.

Preferably, the snap-fastener tabs 21 are not only elastically deformable, but they are also shaped to provide over-center locking with the base 7 of the planet carrier 1 when the stop 14 is secured to the planet carrier 1. This serves to hold it more securely, in particular in the event of the planet carrier 1 vibrating.

In operation, it is ensured firstly that the grooves 15 and the slots 16 are properly aligned with one another. If not, the rotation shafts are turned about their axes until the slots 16 and the grooves 15 extend in register with one another.

Thereafter, it suffices to insert the stop 14 on the central shaft 8 and turn the stop 14 so as to insert its free ends in the slots 16 in the planet carrier 1 and in the grooves 15 in the rotation shafts, beginning with the snap-fastener tabs 21 of said free ends and continuing until the abutments 20 come to rest against one of the ends of the slots 16 in the base 7 of the bottom plate 6. In this position, the various snap-fastener tabs 21 have left the grooves 15 and the slots 16 and have come to rest against the base 7 of the inner plate 6 in the vicinity of the associated rotation shaft, thereby opposing any turning of the stop 14 in the opposite direction, which would separate the stop 14 from the planet carrier 1.

The stop 14 is thus secured to the planet carrier 1 and opposes any movement of the various rotation shafts along the axial direction (parallel to the axis A).

By limiting the groove 15 to the shape of the circularly arcuate free end of the stop 14, the device also opposes the rotation shafts revolving about their own axes.

In addition, not only does snap-fastening the stop 14 to the planet carrier 1 serve to hold it axially as a result of co-operating with the slots 16, it also prevents the stop 14 from turning relative to the plates of the planet carrier 1.

The stop 14 can thus be secured to the planet carrier 1 simply and quickly.

Furthermore, the resulting device is robust because no plastic deformation is needed to secure the stop 14 to the planet carrier 1.

In addition, the planet carrier 1 does not have any notches (such as a groove) in the most heavily stressed zones of the planet carrier 1, in particular such as the junction zones between the outer plate 9 and the inner plate 6.

The stop 14 is preferably shaped so as to present rounded fillets 22 between its various lateral extensions 18. As a result, an operator can easily put the stop 14 into position on the central shaft 8 by causing a rotation shaft to correspond with each fillet 22. The operator then needs only to turn the stop 14 relative to the inner plate 6.

It should be observed that the stop 14 can be removed in destructive manner (which is of little consequence given the low cost of producing said part) or in non-destructive manner (by pushing back the snap-fastener tabs 21 so that they penetrate once more into the associated slot 16 and groove 15, e.g. by using a tool, so as to enable the stop 14 to be turned in the opposite direction).

The stop 14 is thus intrinsically irreversible. Without having a special tool, the stop 14 cannot be disassembled regardless of the forces and vibration to which the device might be subjected.

Figure 3:
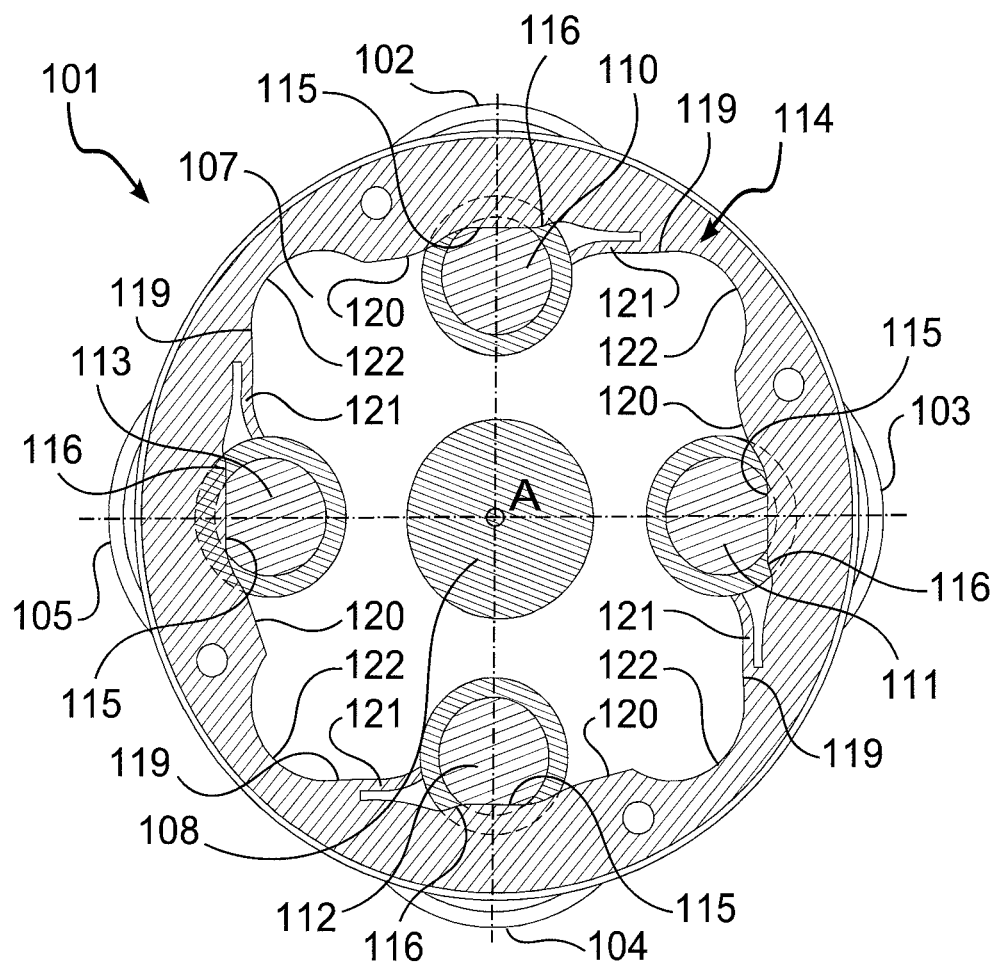
FIG. 3 is a section view of a portion of a transmission device in a second embodiment of the invention.

By way of example, such a device may be used in the field of actuators for aircraft flight control surfaces. A second embodiment is described below with reference to FIG. 3.

In this second embodiment, the planet carrier 101 is identical to the first embodiment. However the stop 114 is different.

Thus, instead of being arranged at the center of the inner plate, the stop 114 is arranged at the periphery of the inner plate. The stop 114 is thus shaped to surround the four rotation shafts on the outside, and no longer on the inside.

As a result, the stop 114 is in the shape of a disk with an opening 119 of polygonal section (about the axis A) in order to be able to arrange the stop 114 around the rotation shafts. The stop 114 is thus arranged on the inner plate at the periphery of the inner plate.

In this example, the stop 114 is plane. The stop 114 is arranged so that a normal to said plane extends substantially parallel to the axis A, and thus to the axes of the various rotation shafts.

It should also be observed that in this embodiment likewise, the stop 114 is centered on the axis A of the planet carrier. Specifically, the stop 114 is coaxial about said axis A.

Said opening 119 in this example is of generally square section (about the axis A), with each side of the square being associated with a respective one of the rotation shafts.

The stop 114 is thus carried by the base 107 of the inner plate by being held axially in the slot 116 in said base 107.

The stop 114 is also likewise shaped so as to be capable of being snap-fastened to said base 107 in order to reinforce the fastening of the stop 114 to the planet carrier 101. This also serves to prevent the stop 114 from turning about the axis A and thus relative to the base 107.

For this purpose, each side of the opening 119 is shaped so as to be inserted in the slot 116 and in the groove 115 of the corresponding rotation shaft.

Each side is also provided with an abutment 120 coming to bear at one end of the slot 116 against the base 107 of the inner plate in the vicinity of the associated rotation shaft when the stop 114 is secured to the planet carrier 101.

Furthermore, a snap-fastener tab 121 is associated with each side, being arranged substantially opposite the abutment 120 associated with that side.

It should be observed that since the stop 114 is plane, the snap-fastener tabs 121 and the abutments 120 thus all lie in the same plane as the remainder of the stop 114.

In particular manner, at least the snap-fastener tab 121, and preferably the entire stop 114, is made of an elastically deformable material. The stop 114 is typically made of a spring material, such as for example, a steel, a copper alloy, or a spring polymer.

Preferably, the snap-fastener tabs 121 are not only elastically deformable, but they are also shaped to provide overcenter locking with the planet carrier 101 when the stop 114 is secured to the planet carrier 101. This serves to hold it more securely, in particular in the event of vibration.

In operation, it is ensured firstly that the grooves 115 and the slots 116 are properly aligned with one another. If not, the rotation shafts are turned about their axes until the slots 116 and the grooves 115 extend in register with one another.

Thereafter, it suffices to insert the stop 114 around the rotation shafts and then turn the stop 114 so as to insert the sides of the opening 119 into the slots 116 and the grooves 115 in the adjacent rotation shafts, beginning with the snap-fastener tabs 121 of said sides and continuing until the abutments 120 come to rest against the corresponding ends of the slots 116 in the base 107 of the inner plate. In this position, the various snap-fastener tabs 121 have left the grooves 115 and the slots 116 and have come to rest against the base 107 of the inner plate in the vicinity of the associated rotation shaft, thereby opposing any turning of the stop 114 in the opposite direction, which would separate the stop 114 from the planet carrier 101.

The stop 114 is thus secured to the planet carrier 101 and opposes any movement of the various rotation shafts in the axial direction (parallel to the axis A).

By limiting the groove 115 to the shape of the side of the opening 119 in the stop 114, the device also opposes the rotation shafts revolving about their own axes.

In addition, not only does snap-fastening the stop 114 to the planet carrier 101 serve to hold it axially as a result of co-operating with the slots 116, it also prevents the stop 114 from turning relative to the plates of the planet carrier 101. The stop 114 can thus be secured to the planet carrier 101 simply and quickly.

Furthermore, the resulting device is robust because no plastic deformation is needed for assembling the stop 114 on the planet carrier 101.

In addition, the planet carrier 101 does not include any notches (such as a groove) in the most stressed zones of the planet carrier 101, in particular such as the junction zones between the outer plate and the inner plate.

The stop 114 is preferably shaped so as to present rounded fillets 122 between the various sides. As a result, an operator can easily position the stop 114 around the rotation shafts by causing each fillet 122 to coincide with a respective rotation shaft. The operator then needs only to turn the stop 114 relative to the inner plate.

It should be observed that the stop 114 can be removed in destructive manner (which is of little consequence given the low cost of producing said part) or in non-destructive manner (by pushing back the snap-fastener tabs 121 so that they penetrate once more into the associated slot 116 and groove 115, e.g. by using a tool, so to enable the stop 114 to be turned in the opposite direction).

The stop 114 is thus intrinsically irreversible. Without having a special tool, the stop 114 cannot be disassembled, regardless of the forces and vibration to which the device might be subjected.

The first embodiment and the second embodiment thus provide different arrangements of the planet carrier that enable the invention to be adapted to a large number of applications without occupying the periphery of the planet carrier.

Figure 4:
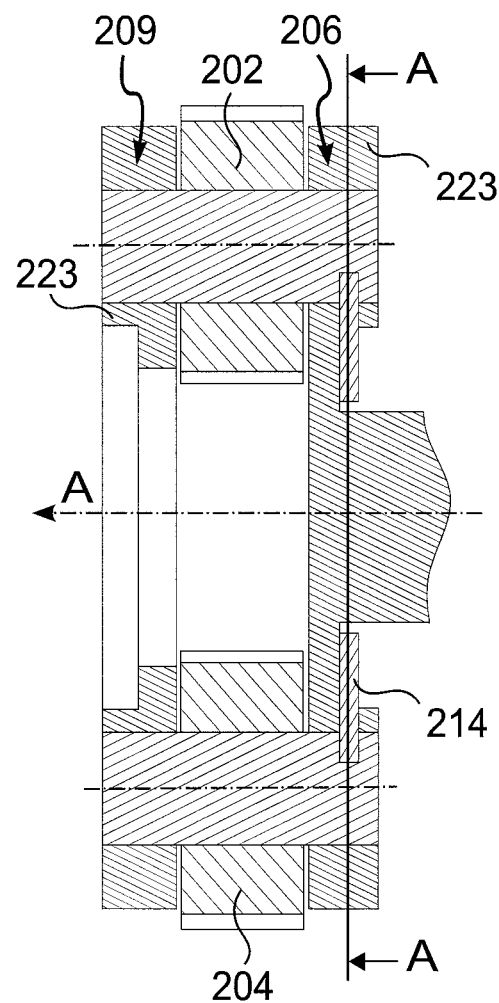
FIG. 4 is a side view showing a portion of a transmission device in a third embodiment of the invention.
Figure 5:
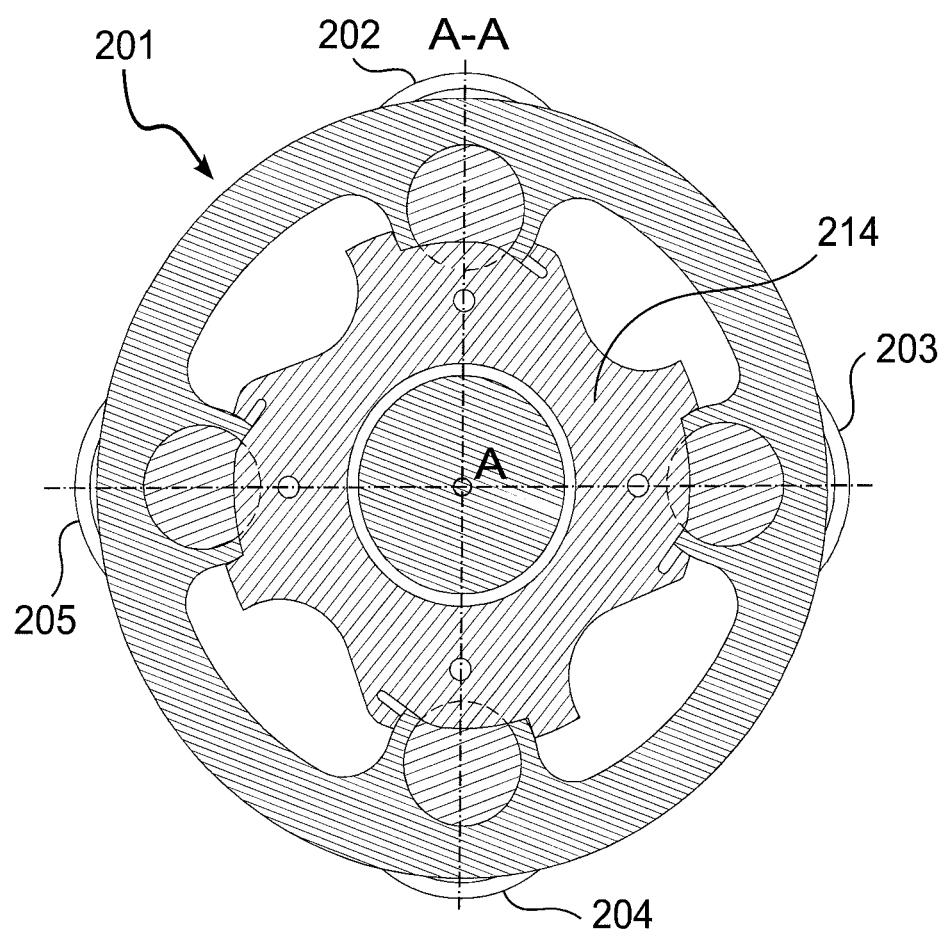
FIG. 5 is a section view of the portion of the device shown in FIG. 4.

A third embodiment is described below with reference to FIGS. 4 and 5.

In this third embodiment, the stop 214 is identical to the stop of the first embodiment. In contrast, the planet carrier 201 is of a structure that differs in that it is reinforced compared with the structure of the first embodiment.

Thus, the inner plate 206, like the outer plate 209, has a peripheral ring 223 surrounding the various rotation shafts on the outside.

Figure 6:
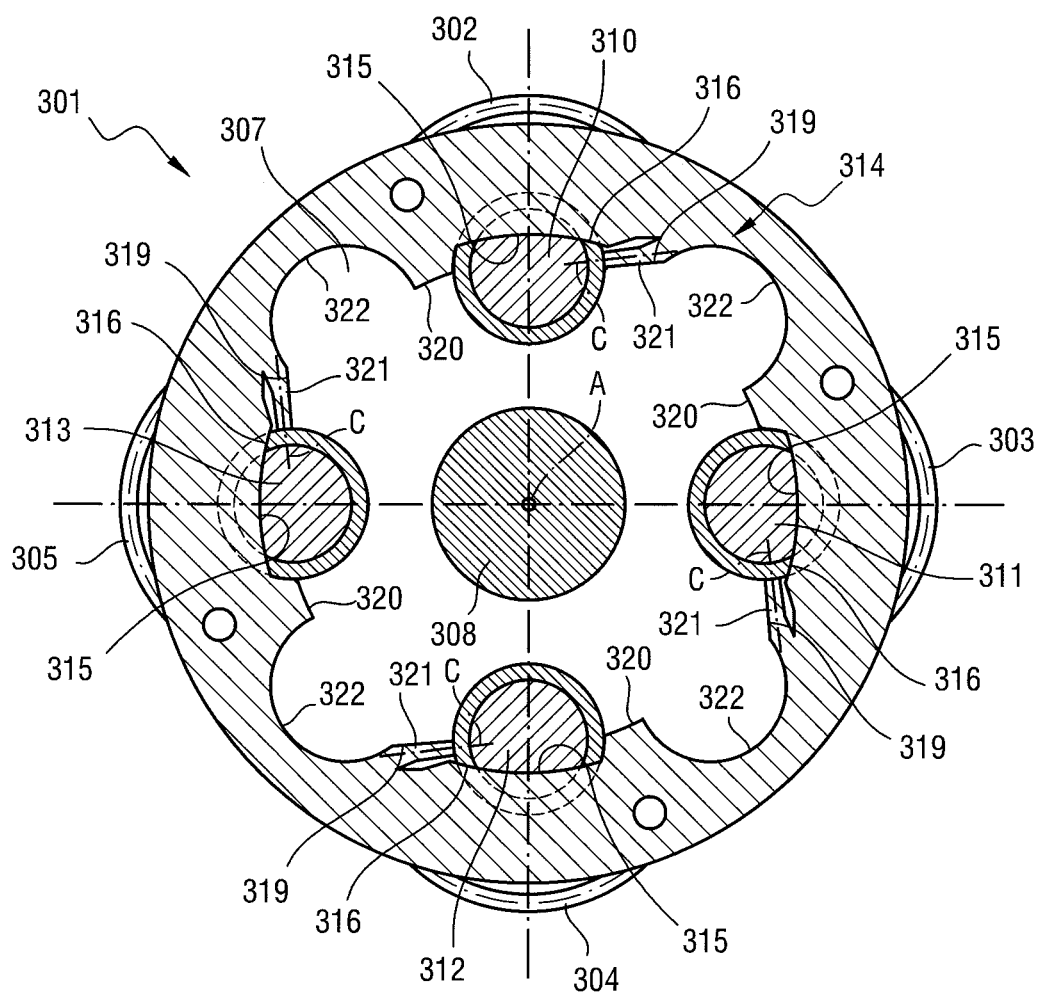
FIG. 6 is a section view of a portion of a transmission device in a fourth embodiment of the invention.
Figure 7:
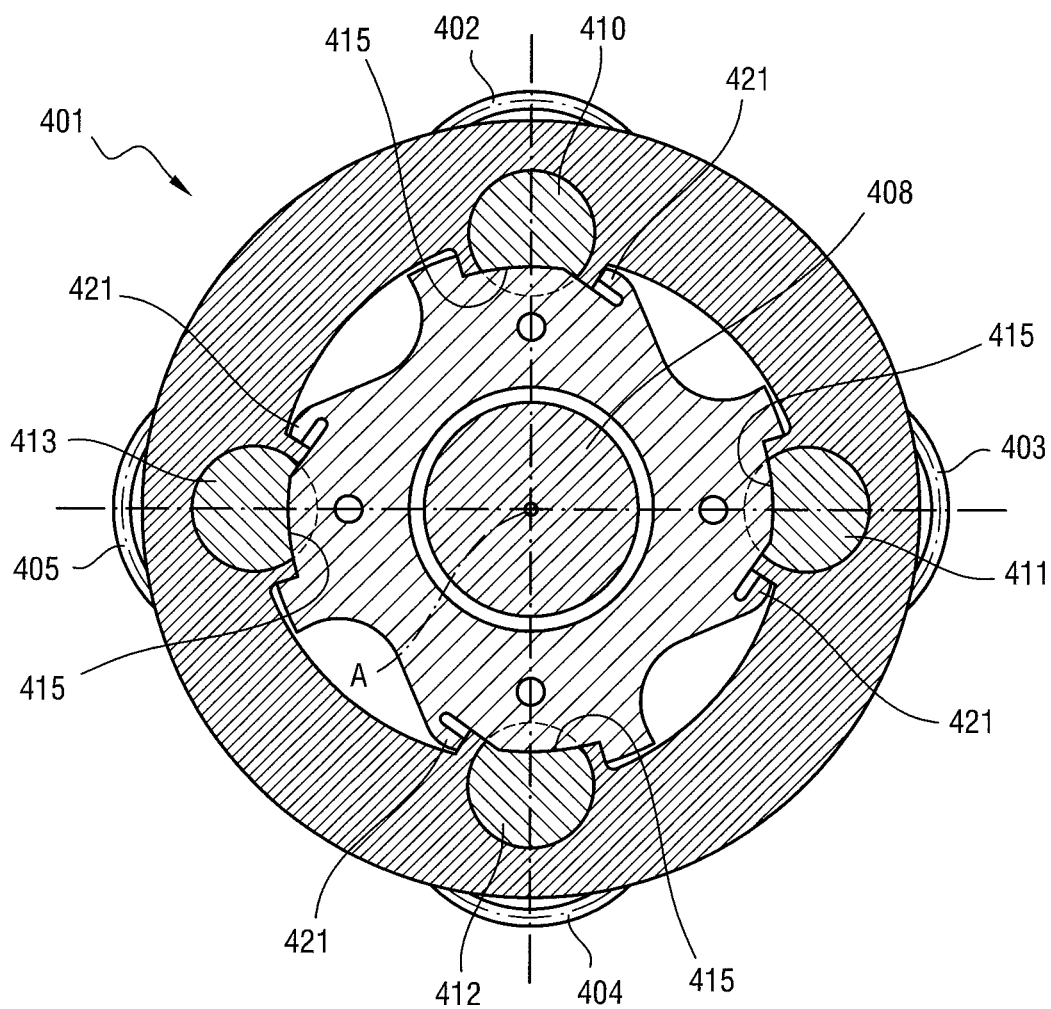
FIG. 7 is a section view of a portion of a transmission device in a fifth embodiment of the invention.

With reference to FIGS. 6 and 7, it is naturally possible to envisage other embodiments. In the above embodiments, the stops are not removable (unless a special tool is available). This was done in particular to ensure that the forces or vibration that might be applied to the snap-fastener tabs do not tend to disengage said tabs.

It is possible to modify the shape of the device in order to accentuate that effect. In particular, modifying the device in order to limit deformation of the snap-fastener tabs under the forces and vibration to which they are subjected in operation serves to accentuate this effect.

For example, with reference to FIG. 6, and in a fourth embodiment, it is the snap-fastener tabs that are shaped to limit deformation of said snap-fastener tabs in operation.

Each snap-fastener tab 314 in this example is shaped so as to extend in a direction C that is substantially perpendicular to a bearing face of said snap-fastener tab against the base 307.

With reference to FIG. 7, and in a fifth embodiment, in addition to or as a replacement for the fourth embodiment, it is the planet carrier 401 and/or the stop 414 that are shaped to limit deformation of the snap-fastener tabs in operation.

By way of example, a ring of the inner plate and/or of the outer plate is shaped to extend further towards the snap-fastener tabs in order to limit any deformation thereof in operation.

Naturally, the invention is not limited to the embodiments described and embodiment variants may be applied thereto without going beyond the ambit of the invention as defined by the claims.

In particular, the mechanical transmission device may be different from the description above. Thus, although the mechanical transmission device is described as having four planets, the device could have a different number of planets, e.g. two or three. The planet carrier could comprise a single plate only. The plate(s) could be of a shape other than that described, e.g. it could present a central portion that is substantially triangular, possibly with an outer portion of a shape that is different or identical. Although in this example the rotation shafts of the planet do not present any shoulders at their ends, said shafts could have shoulders at one or both ends. The shoulders would then rest against the main faces of the outer or inner plates.

Although the grooves are described as being smooth, the grooves in the rotation shafts could be knurled so as to enhance the effect of opposing rotation of said shafts about their own axes by friction of the stop against the knurling. The snap-fastener tabs could then be shaped so as to engage in the grooves while the stop is in position on the planet carrier (instead of resting against the planet carrier) so as to improve the anti-friction effect.

Although the grooves are described as not extending over the entire circumference of associated rotation shaft, said grooves could extend around the entire circumference of the associated rotation shafts. In both situations, the rotation shafts could equally well be hollow or solid.

Likewise, the stop could be of a shape that is different from that described. In particular, although the stop is described as forming a plane annular structure centered on the axis A of the planet carrier, thereby presenting small thickness, it is possible to envisage the stop forming a solid of revolution, e.g. a cylinder.

For example, the central orifice could be of a shape other than circular in the first embodiment and other than polygonal in the second embodiment. The stop could have a number of lateral extensions and/or of opening sides, and/or of snap-fastener tabs, and/or of abutments that is greater that the number of rotation shafts of the planet carriers. The stops could thus be shaped to present two snap-fastener tabs per rotation shaft, thereby further improving the securing of the stops to the planet carrier.

The stop could be secured to the planet carrier other than at the base of the inner plate, such as at the shaft of the inner plate, or indeed at the outer plate.

The invention claimed is:

1. A mechanical transmission device comprising a planet carrier and at least two planets mounted on the planet carrier by means of respective rotation shafts, the device being wherein it includes a stop for stopping movement of the various rotation shafts in axial translation, the stop being shaped to be secured to the planet carrier by snap-fastening to said planet carrier, the stop including portions inserted in grooves formed in each of the rotation shafts and in corresponding slots in at least one plate of the planet carrier carrying the rotation shafts of the planet carrier, which slots give access to said grooves, the stop thus being carried by said plate by co-operation with said slots, each of said portions of the stop including an abutment and a snap-fastener tab for snap-fastening the stop to the planet carrier at each of said rotation shafts, with the stop being plane.

2. The device according to claim 1, wherein the planet carrier extends about a main axis and the stop is shaped to be coaxial with said main axis.

3. The device according to claim 2, wherein the stop is shaped to be arranged at the center of the planet carrier.

4. The device according to claim 2, wherein the stop is shaped to be arranged at the periphery of the planet carrier.

5. The device according to claim 1, wherein the device includes at least one plate having a base and a central shaft extending said base, the stop being carried by said base.

6. The device according to claim 1, wherein each of the grooves formed in each of the rotation shafts are arranged respectively over a fraction only of the circumference of the associated rotation shaft.

7. The device according to claim 1, wherein the stop includes rounded fillets between its various portions.

8. The device according to claim 1, wherein the device includes at least three planets.

\* \* \* \* \*